US007011784B2

(12) United States Patent
Lin et al.

(10) Patent No.: US 7,011,784 B2
(45) Date of Patent: Mar. 14, 2006

(54) INDUSTRIAL NYLON COMPOSITION

(76) Inventors: Lung-Tao Lin, No. 13, Tz-Li Street, Feng-Yuan City, Taichung Hsien (TW); Ming-Fung Lin, No. 300-8, 2-Section, Shiang-Shang Road, Taichung City (TW)

( * ) Notice: Subject to any disclaimer, the term of this patent is extended or adjusted under 35 U.S.C. 154(b) by 180 days.

(21) Appl. No.: 10/352,092

(22) Filed: Jan. 28, 2003

(65) Prior Publication Data

US 2004/0147689 A1 Jul. 29, 2004

(51) Int. Cl.
*C08J 5/00* (2006.01)

(52) U.S. Cl. .................. 264/331.19; 264/319; 525/432

(58) Field of Classification Search ................ 525/432; 264/294, 319, 331.19

See application file for complete search history.

(56) References Cited

FOREIGN PATENT DOCUMENTS

| | | |
|---|---|---|
| JP | 58-176214 | * 10/1983 |
| JP | 05-345856 | * 12/1993 |
| JP | 06-32978 | * 2/1994 |
| KR | 93-03362 | * 4/1993 |

* cited by examiner

*Primary Examiner*—Ana Woodward
(74) *Attorney, Agent, or Firm*—Rosenberg, Klein & Lee

(57) ABSTRACT

An industrial nylon composition comprises nylon block copolymerized or blended with poly-m-phenyleneisophthalamide (PmIA), thereby forming a block copolyamide composition or blend, comprised of molecules of nylon in stable and regular polymeric arrangement with molecules of PmIA. The subject nylon composition has industrially useful heat resistance, flexible elongation and tensile strength, while retaining many of nylon's desirable qualities.

4 Claims, 5 Drawing Sheets

| Code | Wt.% of PmIA | $T_b$ (MPa) | $E_b$ (%) | $M_i$(GPa) |
|---|---|---|---|---|
| Ny | 0 | 45.19 | 44.0 | 0.88 |
| $M_1$ | 1 | 48.50 | 27.8 | 1.05 |
| $M_2$ | 3 | 52.21 | 27.1 | 1.29 |
| $M_3$ | 5 | 55.42 | 21.2 | 1.41 |
| $M_4$ | 10 | 63.85 | 13.7 | 1.58 |
| $M_5$ | 15 | 60.73 | 8.5 | 1.63 |
| $M_6$ | 20 | 59.02 | 5.9 | 1.67 |

FIG. 8

| Code | Polymer | $T_b$ (MPa) | $E_b$ (%) | $M_i$(GPa) |
|---|---|---|---|---|
| Nm | PmIA * | 70.0 | 11.2 | 9.26 |
| $B_{M1}$ | Multiblock10% | 78.93 | 15.6 | 8.98 |
| $B_{T1}$ | Triblock 10% | 44.17 | 23.0 | 2.95 |
| Ny | Nylon6 | 45.19 | 44.0 | 0.886 |

FIG. 9

| Code | Polymer | $T_g$(℃) | $T_m$(℃) | $X_C$(%) | $\triangle H_{fus}$(J/g) |
|---|---|---|---|---|---|
| Ny | Nylon6 | 67 | 219 | 24 | 43 |
| Nm | PmIA | 275 | 473 | — | — |
| $M_1$ | PmIA 1% | 127 | 217 | 31 | 57.9 |
| $M_2$ | PmIA 5% | 130 | 218 | 38 | 71.8 |
| $M_3$ | PmIA 10% | 134 | 223 | 43 | 80.6 |
| $M_4$ | PmIA 15% | 136 | 216 | 40 | 75.5 |
| $M_5$ | PmIA 20% | 140 | 218 | 39 | 73.7 |
| $B_T$ | PmIA 20% | 112 | 198 | — | — |
| $B_M$ | PmIA 20% | 140 | 454 | — | — |

FIG. 10

INDUSTRIAL NYLON COMPOSITION

BACKGROUND OF THE INVENTION

1. Field of the Invention

The present invention relates to nylon composition, and more particularly to an industrial nylon composition characterized by industrially useful heat resistance, elastic flexible elongation and tensile strength.

2. Description of the Related Art

Conventional nylon-6 (or nylon-66) is, generally speaking, a polymer, and more particularly, a flexible polyamide with a folding crystalline structure that is characterized by excellent elongation and softness. However, conventional nylon-6 (or nylon-66) has a low modulus of stiffness and poor heat resistance, so that it is not useful for use in heat-resistant and wear-resistant industrial products. Among the efforts to overcome these limitations, Takayanagi proposed combining nylon-6 and Kevlar so as to enhance the heat-resistant and wear-resistant features of nylon-6.

SUMMARY OF THE INVENTION

The present invention uses a non-crystalline rigid polymer, poly-m-phenyleneisophthalamide (PmIA) composition, to reinforce the flexible nylon-6 (or nylon-66) polymer.

The primary objective of the present invention is to provide a nylon composition having industrially useful flexible elongation and tensile strength, and a method for its production.

Another objective of the present invention is to provide an industrial nylon composition with enhanced heat-resistance, and a method for its production.

A further objective of the present invention is to provide a nylon composition that can be used industrially as a reinforcement material, and a method for its production.

In accordance with a preferred embodiment of the present invention, there is provided an industrial nylon composition comprising a poly-m-phenyleneisophthalamide (PmIA) composition copolymerized with a telechelic nylon thereby yielding a block copolyamide composition consisting of molecules of nylon in block polymeric association with molecules of PmIA.

In accordance with another embodiment of the present invention, there is provided a method of manufacturing a related industrial nylon blend composition, comprising the steps of:

- dissolving a telechelic nylon-6 prepolymer solution in N-methyl-2-pyrrolidone (NMP);
- adding a lithium chloride (LiCl) solvent; then,
- cooling the resulting solution to 0° C.; then,
- adding a PmIA prepolymer solution to the cooled NMP-LiCl solution and stirring vigorously;
- maintaining the resulting solution at a relatively cold temperature for a predetermined period of time;
- warming the cooled NMP-LiCl solution to room temperature;
- stirring for a predetermined period of time sufficient for the reaction to terminate;
- drying the solution and coating it onto a clean carrying plate to be heated and dried for a predetermined number of hours; then,
- removing the solution from heating and placing it into ice water, so that salt diffuses out; and finally, placing the resulting solution into a vacuum oven to be dried, thereby yielding the final block copolyamide nylon product.

Further benefits and advantages of the present invention will become apparent after a careful reading of the detailed description with appropriate reference to the accompanying drawings.

BRIEF DESCRIPTION OF THE DRAWINGS

FIG. 8 is a table comparing the physico-mechanical characteristics of the polyblend and pure nylon;

FIG. 9 is a table comparing the physico-mechanical features of block copolyamide and pure nylon; and, FIG. 10 is a DSC analysis table comparing physico-chemical properties of the polyblend, the block copolyamide and pure nylon-6.

DETAILED DESCRIPTION OF THE INVENTION

Referring to FIGS. 1–10, an industrial nylon composition in accordance with a preferred embodiment of the present invention comprises telechelic nylon-6 (or nylon-66) block copolymerized with poly-m-phenyleneisophthalamide (PmIA) to yield a block copolyamide material comprised of molecules of nylon-6 (or nylon-66) in stable and regular block polymeric arrangement with molecules of PmIA.

Figure 1:
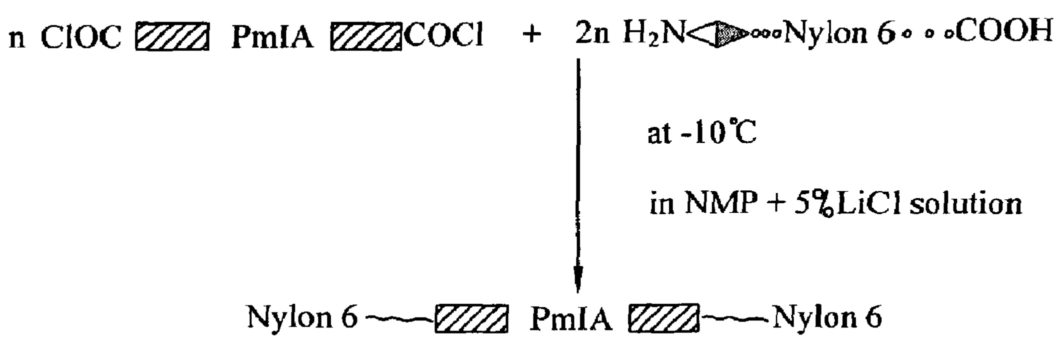
FIG. 1 is a schematic view of a triblock copolyamide.

As shown in FIG. 1, the polymeric pattern of the block copolyamide of telechelic diamine type nylon-6 and PmIA is nylon-6~PmIA~nylon-6, the so-called triblock polyamide. Alternatively, the polymeric pattern of the block copolyamide of the telechelic nylon-66 and the PmIA is nylon-66~PmIA~nylon-66.

Figure 2:
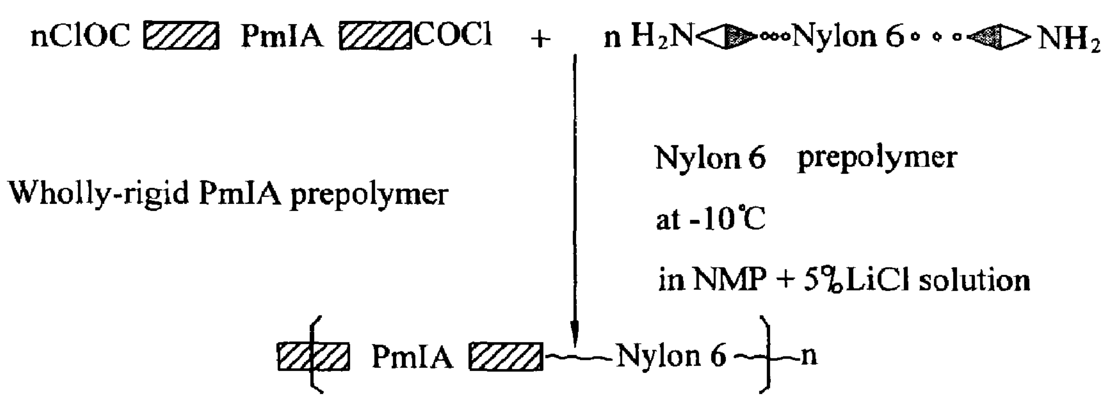
FIG. 2 is a schematic view of a multiblock copolyamide.

As shown in FIG. 2, the polymerized pattern of the block copolyamide of the telechelic nylon-6 and the PmIA is (PmIA~nylon-6), the so-called multiblock polyamide. Alternatively, the polymeric pattern of the block copolyamide of nylon-66 and PmIA is (PmIA~nylon-66).

In an alternative preferred embodiment of the present invention, telechelic nylon-6 (or nylon-66) and PmIA is physically mixed and mechanically blended to form a polyblend composition, synonymously referred to as a polymer alloy. In a synthesis of the polyblend composition, nylon-6 (or nylon-66) and PmIA are dissolved in formic acid to form a homogenous phase and then a reaction product is precipitated out of solution when the reaction is quenched by adding a sufficiently large amount of water. The quenched reaction product is then allowed to sit for a few days after which it is further quenched and washed with methanol and then vacuum dried thereby yielding the polyblend composition. The resulting polyblend composition can be formed, for example, so as to function as knitting material. In addition, the resulting polyblend composition can be heat pressed by a heat forming press under a pressure of 20

$kg/cm^2$ at a temperature of 230° C. for 20 minutes, and then allowed to cool to 60° C., thereby yielding the polyblend composition as a sheet plate.

In the block copolyamide compositions of the present invention, the relative amount by weight of PmIA in the block copolyamide is in the range between 5% and 20% so as to impart therein more desirable characteristics.

Figure 6:
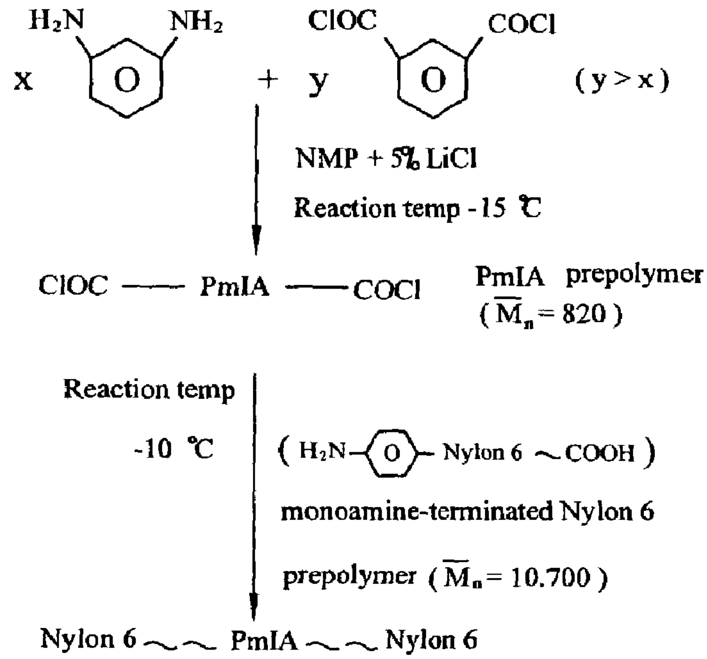
FIG. 6 is a reaction flow chart of the synthesis of a triblock copolyamide.
Figure 7:
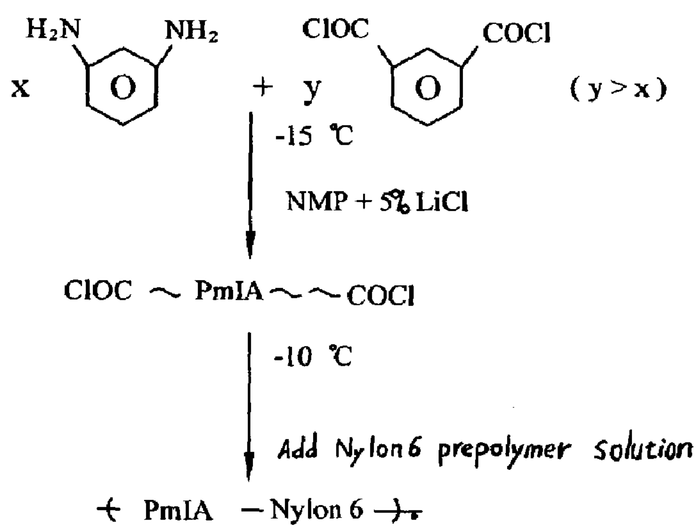
FIG. 7 is a reaction flow chart of the synthesis of a multiblock copolyamide.

Referring to FIGS. 6 and 7, in the process of manufacturing the industrial nylon block copolyamide composition of the present invention, a telechelic nylon-6 prepolymer solution is first dissolved in N-methyl-2-pyrrolidone (NMP), then lithium chloride (LiCl) is added to the solution cooled to 0° C., added to the PmIA prepolymer solution and then stirred vigorously. The system is maintained at this low temperature for a predetermined period of time, and is then allowed to warm to room temperature; the stirring continues for a sufficient period of time for the reaction to be completed.

The resulting solution is dried—by evaporating the solvent—and the residue is then coated onto a clean carrying plate to be heated and further dried for a few hours. It is then removed and placed into an ice water bath thereby allowing the salt to diffuse out, and finally is oven dried in a vacuum, to thereby yield the final block copolyamide product.

Figure 5:
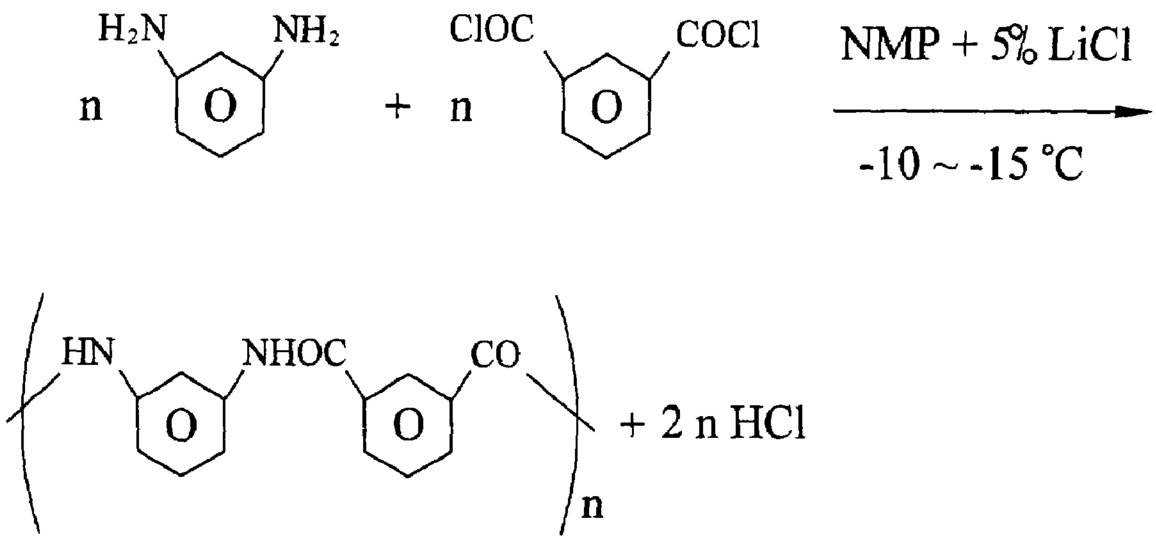
FIG. 5 is a reaction flow chart of the synthesis of PmIA.

Referring to FIG. 5, in a preferred method of the PmIA prepolymer solution of the present invention, m-phenylene-diamine (MPA) is dissolved in NMP, and then mixed with LiCl solvent. The resulting system is cooled under 0° C. Then, a stoichiometric excess of isophthaloyl dichloride (IPC) is added to initiate and drive the reaction, yielding thereby the PmIA prepolymer solution.

In an alternatively preferred method of synthesizing the PmIA prepolymer of the present invention, MPA is dissolved with NMP in LiCl solvent. The system is cooled to a temperature in the range of −10° C. to −15° C. Then, a stoichiometric excess of IPC is added so as to initiate and drive a reaction at the sub-zero temperature. The system is then allowed to warm to room temperature as the reaction continues. Finally, a large amount of water is added to the system, thereby precipitating the reaction product out of solution, which then is washed with methanol and vacuum dried to yield the PmIA prepolymer.

Figure 3:
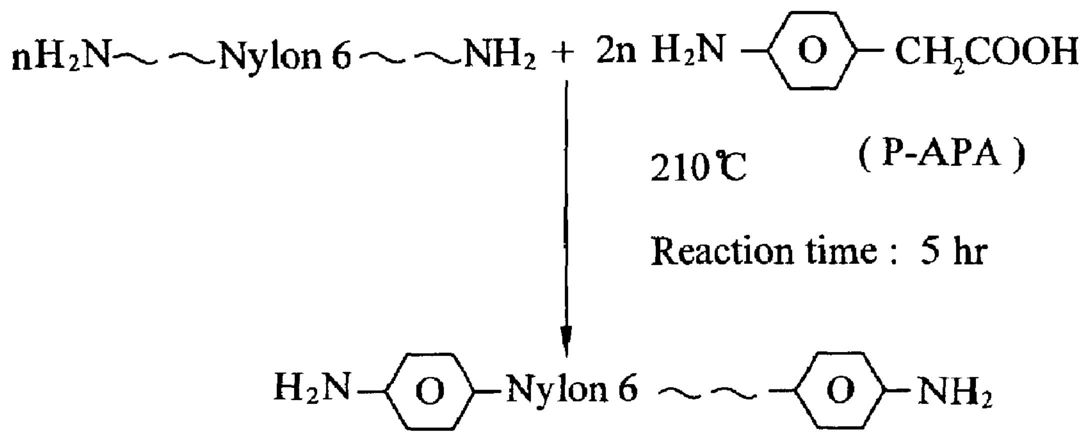
FIG. 3 is a schematic view of the bulk polymerization reaction of a the diamine type telechelic nylon-6 with para-Aminophenylacetic acid, in a one-to-two stoichiometry respectively.
Figure 4:
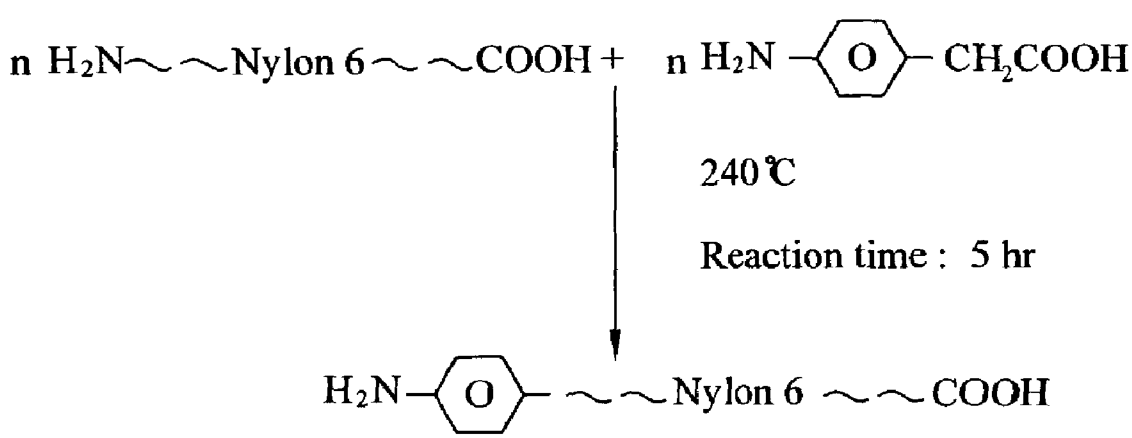
FIG. 4 is a schematic view of the bulk polymerization reaction of the high molecular weight telechelic nylon-6 with para-Aminophenylacetic acid.

Furthermore, in a preferred method of manufacturing the telechelic nylon-6 prepolymer of the present invention, the diamine type telechelic nylon-6, or the higher molecular weight telechelic nylon-6, is reactively combined and bulk polymerized with p-aminophenyl acetic acid (P-APA), the coupling agent. The polymerization reaction of the diamine type telechelic nylon-6 with p-APA is shown in FIG. 3. The corresponding polymerization reaction of the higher molecular weight telechelic nylon-6 with p-APA is shown in FIG. 4.

In the synthesis of diamine type nylon-6, ε-caprolactam and ε-aminohexanoic acid are reacted under nitrogen, in a nine-to-one stoichiometry respectively, 150° C., then heated to 180° C. and allowed to further react for a predetermined period of time, and then heated to 200° C. Then, an excess of hexamethylene diamine (HMDA) is introduced into the system and allowed to react for a suitably effective period of time. Finally, the system is heated to 250° C. and the reaction allowed to continue for a period of time, then cooled to room temperature, mixed with water to quench the polymerization reaction, and then stirred vigorously for 24 hours with a mixture of water and methanol, present in relative volume amounts substantially equal to 4:1; the reaction product is then vacuum dried to yield the diamine type telechelic nylon-6.

In a synthesis of the higher molecular weigh telechelic nylon-6, ε-caprolactam and ε-aminohexanoic acid are reacted under nitrogen in a nine-to-one stoichiometry respectively, for 2 hours at 150° C., then further heated to 250° C. to continue to react for 4 hours, then cooled to room temperature, the anionic polymerization reaction quenched with water, vacuum dried and dissolved in formic acid, then further washed and quenched with a large amount of water then with methanol, and then vacuum dried to yield the higher molecular weight telechelic nylon-6.

Thus, the present invention uses PmIA to reinforce nylon-6 (or nylon-66) by polymerically combining these two essential starting polymers into a block copolyamide. The experimentally demonstrated physico-mechanical characteristics of the subject invention multiblock copolyamide, and in the alternative, the experimentally demonstrated physico-mechanical characteristics of the subject invention polyblend composition, support the fact that the present inventive PmIA reinforced nylon compositions achieve the desired industrial level reinforcement effect.

Experiments with the copolyamide compositions of the present invention support the following conclusions.

The experimental data shown in FIG. 8 evidence that as the relative weight percent content of PmIA in the polyblend is increased from 1% to 20% ($N_y$ indicates the pure nylon, and $M_1$ indicates that the relative content of PmIA in polyblend is 1%, etc.), the tensile strength is likewise increased proportionately.

As shown in FIG. 9, $B_{M1}$ indicates the relative PmIA content of the multiblock copolyamide is 10%, wherein the reinforcement effect is more pronounced and the tensile strength reaches 78.93 MPa. In the table, $T_b$ is tensile strength, and $M_i$ is the initial modulus.

As shown in FIG. 10, thermal analysis of the DSC indicates that the glass transition temperature ($T_g$) of both the polyblend $M_1$ to $M_5$ and the multiblock copolyamide $B_m$ is greater than that of nylon-6.

From observations of the surface structure using scanning electron microscopy (SEM), the surface of the multiblock copolyamide has a uniform-phase structure, strongly suggesting that the polymerized multiblock copolyamide molecular structure is better suited for industrial applications.

Accordingly, the synthetic methods of the present invention yield PmIA-enhanced nylon compositions with industrially useful characteristics, such as wear-resistance, stiffness, heat-resistance, etc.

Although the invention has been explained in relation to its preferred embodiment(s) as mentioned above, it is to be understood that many other possible modifications and variations can be made without departing from the scope of the present invention. It is, therefore, contemplated that the appended claims cover such modifications and variations as fall within the true scope of the invention.

What is claimed is:

1. A method for manufacturing an industrial nylon composition, wherein said industrial nylon composition comprises a nylon-6 polyblend composition that is prepared by the sequential steps of:

(a) dissolving a nylon-6 and a poly-m-phenyleneisophthalamide (PmIA) in a formic acid solution to form an intermediate homogenous phase system;

(b) quenching said system by adding a large amount of water;

(c) allowing the quenched system to sit for a few days;

(d) washing and quenching with a methanol solution; and, (e) vacuum drying to form thereby the nylon-6 polyblend composition.

2. The method as recited in claim 1, wherein the polyblend nylon-6 composition is heat pressed by a heat forming press under a pressure of 20 kg/cm$^2$ at 230° C. for a period of 20 minutes, and then allowed to cool to 60° C., thereby forming a sheet plate.

3. A method for producing an industrially useful nylon polyblend composition, wherein said industrially useful nylon polyblend composition comprises a poly-m-phenyleneisophthalamide (PmIA) and nylon-66 polyblend composition prepared by the sequential steps of:

(a) dissolving nylon-66 and PmIA in a formic acid solution to form an intermediate system;

(b) quenching said system by adding an effective amount of water;

(c) allowing the quenched system to sit for a predetermined amount of time;

(d) washing and quenching with a methanol solution; and, (e) vacuum drying to form thereby the PmIA and nylon-66 polyblend composition.

4. The method as recited in claim 3, wherein the polyblend nylon-66 composition is heat pressed by a heat forming press under a pressure of 20 kg/cm$^2$ at 230° C. for a period of 20 minutes, and then allowed to cool to 60° C., thereby yielding a sheet plate.

* * * * *